United States Patent Office 3,188,718
Patented June 15, 1965

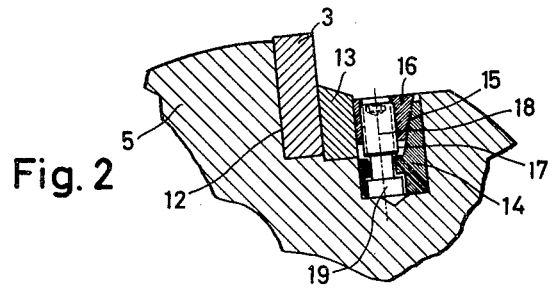
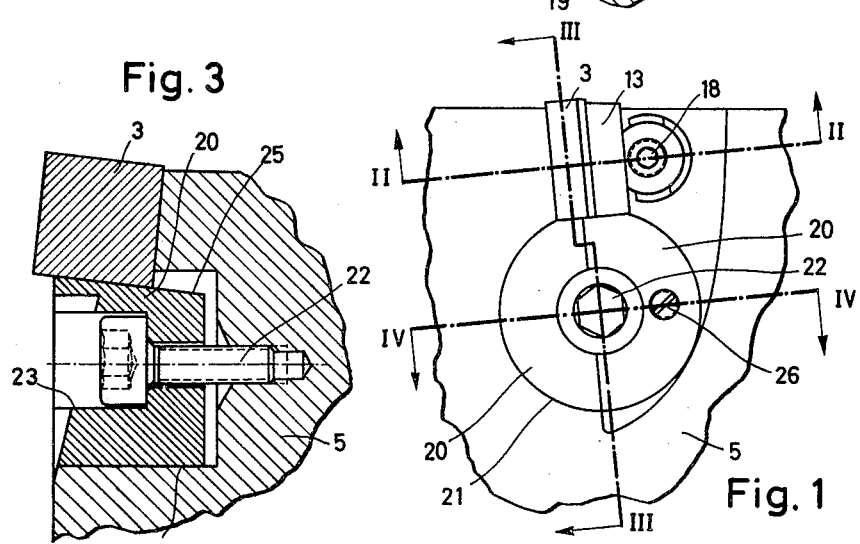
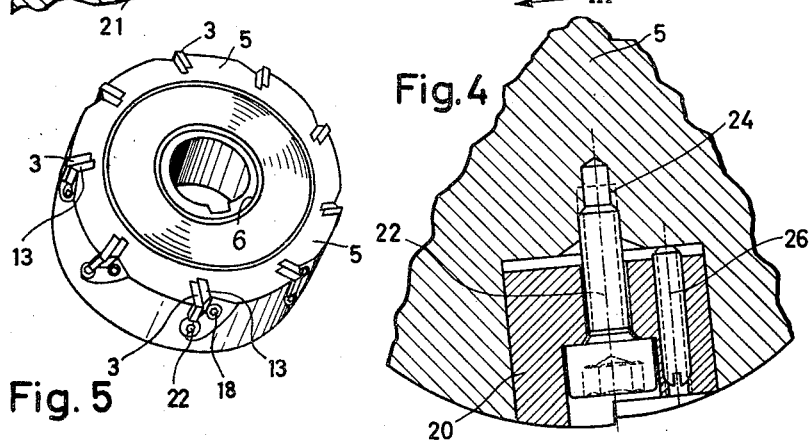

3,188,718
PRECISION MILLING CUTTER WITH
INSERTED TEETH
Hansgeorg Wezel, Maulbronn, Wurttemberg, Germany,
assignor to Wetzel International, Bloomfield, Conn.
Filed Apr. 8, 1963, Ser. No. 271,322
Claims priority, application Germany, Apr. 10, 1962,
B 66,749
13 Claims. (Cl. 29—105)

This invention relates to milling cutters with inserted teeth, and more particularly to fastening means for securing the teeth in a cutter body in a precisely determined position.

In its more specific aspects, the invention is concerned with the type of milling cutter in which the teeth are partly embedded in a cutter body. The length of the tooth portion projecting outward of the cutter body is adjustable by means of an abutment member which backs each tooth against the pressure of a work piece exerted in a direction inward of the cutter body.

An object of the invention is the provision of simple and sturdy means for steplessly adjusting the projecting length of each tooth.

Another object is the provision of adjustable abutment means for backing the teeth of a milling cutter in such a manner that each tooth may be removed from the cutter body, and reinserted in an inverted position into the same recess of the cutter body without any need for readjusting its cooperation with the coordinated abutment member.

A further object of the invention is the provision of an abutment member which remains effective without requiring adjustment if the coordinated tooth is replaced by another tooth, and thus to ensure reproducible precision milling of a work piece.

An additional object is the avoidance of the tolerances caused in conventional milling cutters by looseness and play in threaded connections.

Yet another object is the provision of an abutment member which is a unitary structure guided and supported in the cutter body in such a manner that its position and its path of adjusting movement are precisely determined over the entire useful life span of the cutter.

Other objects and many of the attendant advantages of this invention will be readily appreciated as the same becomes better understood by reference to the following detailed description when considered in connection with the accompanying drawings wherein:

FIG. 1 shows a detail of a milling cutter including a portion of the cutter body, one of the teeth, and fastening means associated with the tooth, the view being in side elevation;

FIGS. 2, 3, and 4 respectively show the device of FIG. 1 in section on the lines II—II, III—III, and IV—IV; and FIG. 5 is a perspective view of the cutter of FIGS. 1 to 4 on a greatly reduced scale.

Referring now to the drawing in detail, and initially to FIG. 5, there is seen a face milling cutter having a substantially cylindrical body 5 and a plurality of teeth 3 spaced about a central integral hub 6 of the cutter body which is apertured for securing the cutter on a drive shaft in the usual manner.

As shown in FIG. 1, the cutter body 5 has a circumferential recess 12 for each of the teeth 3. Each tooth is circumferentially clamped in the corresponding recess 12 to the body 5 by means of clamping devices which circumferentially clamp the tooth 3 against a wall of the recess 12 in a precisely determined axial position. As will best be seen from joint consideration of FIGS. 1 and 2, circumferential clamping pressure is transmitted to the tooth 3 by a clamping plate 13 which has a flat radial face in contact with a corresponding face of the tooth 3, and which also serves as a chip breaker.

An insert 14 is radially movable in the recess 12 and has a flat face 15 spacedly opposite the clamping plate 13. The face 15 is inclined at an acute angle relative to the opposite face of the plate 13. An internally threaded wedge 16 is conformingly interposed between the opposite faces of the insert 14 and of the clamping plate 13, one flat wedge face 17 being in contact with the inclined face 15, and the other flat wedge face being in contact with the clamping plate 13.

A clamping screw 18 threadedly engages the wedge 16 and is freely rotatable in a smooth bore of the insert 14. A shoulder in that bore axially retains the enlarged head 19 of the screw 18 so that the clamping screw 18 may force the wedge 16 inward of the recess 12 when it is turned in one direction by means of a key (not illustrated) engaging a hexagonal recess in the exposed radial face of the screw 18. Rotation of the key in the other direction causes the wedge 16 to be withdrawn from the recess. The milling tooth 3 is correspondingly clamped tight against a radial wall of the recess 12, or released for replacement or reversal.

The axial position of the tooth 3 is precisely adjustable by means of a mechanism illustrated in FIGS. 1, 3, and 4. A recess 21 of generally cylindrical shape, and of a diameter substantially greater than the circumferential width of the tooth 3 communicates with the recess 12 along a slot which is elongated in the direction of the axis of the recess 21. An abutment member 20 generally conforms to the shape of the recess 21 except for the portion of the member 20 which is normally adjacent the slot leading into the recess 12. The portion of the otherwise cylindrical abutment member 20 opposite the slot has a flat face 25 which is inclined at an acute angle relative to the axis of the member 20 so as to approach the axis in a direction inward of the cutter body 5.

The enlarged head of a fastening screw 22 is movably received in an axial recess 23 of the abutment member 20. The screw passes freely through an axial bore in the abutment member 20 and threadedly engages a tapped blind hole 24 in the bottom of the recess 21. The tooth 3 extends from the recess 12 through the slot into the recess 21, and conformingly engages the flat abutment face 25 of the member 20. The tooth 3 is of rectangular cross section in the axially sectional view of FIG. 3. The cross section may also have the shape of a trapezoid, particularly an isosceles trapezoid.

As shown in FIG. 4, an eccentric axial threaded bore in the abutment member 20 receives a set screw 26 an end portion of which projects from the abutment member toward the bottom of the recess 21. When the tooth 3 is released by the clamping plate 13, the axial position of the abutment member 20 in the recess 21 may be precisely and steplessly adjusted by first turning the screw 26 until it projects outward over a desired distance, and by then tightening the screw 22 firmly to force the free end of the screw 26 against the bottom of the recess 21. One may also first adjust the position of the abutment member 20 by suitable threaded movement of the screw 22 in the hole 24, and subsequently move the screw 26 inward of the recess 21 until it is tight. The tooth is then pushed against the abutment face 25, and clamped tight by means of the screw 18.

Because of its wedging engagement with the flat face 25 of the abutment member 20, axial movement of the tooth 3 inward of the cutter body 5 is precisely limited by the position of the abutment member 20. It will be appreciated that all working stresses exerted on the tooth 3 in the direction of the cutter axis are inward of the cutter body, and that it is not necessary to make provisions for limiting outward movement. Such outward movement is adequately prevented by the clamping means which urge the tooth against the circumferential wall of the recess 12.

Only one unitary structural element, namely the abutment member 20, needs to be shifted for determining or changing the axial position of the tooth 3. The precise adjustment of the tooth in an axial direction is not subject to variation due to clearance in gradually wearing threads, as is the case in known devices. Clearance between the screw 22 and the hole 24 does not affect precision. The large contact area of the member 20 and of the generally conforming recess 21 distributes pressure and prevents wear. The abutment member 20 is precisely guided during the entire useful life of the cutter body 5. The angle of inclination of the abutment face 25 relative to the axis of the abutment member 20 is so small that the abutment member 20 cannot be displaced under the axial pressures exerted by a work piece on the tooth 3. The precise position of the tooth is maintained regardless of work pressure.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What is claimed is:
1. A milling cutter comprising, in combination:
 (a) a cutter body member having an axis and formed with a plurality of recesses circumferentially spaced about said axis, said cutter body member having a wall in each recess;
 (b) a plurality of cutter teeth mounted on said body member, each cutter tooth being partly received in a coordinated one of said recesses in contact with said wall, and partly projecting from said body member in a first direction substantially parallel to said wall;
 (c) clamping means on said body member, said clamping means engaging said tooth for exerting clamping pressure on the same in a second direction transverse of said first direction toward said wall, and for thereby securing said tooth against movement relative to said body member;
 (d) an abutment member slidable in said one recess in a third direction transverse of said first and second directions, said abutment member having an abutment face extending in said second direction and obliquely inclined relative to said first and third directions, said abutment face defining a smaller acute angle with said third direction than with said first direction and abuttingly engaging a portion of said tooth; and
 (e) securing means for selectively securing said abutment member against sliding movement in said recess in a plurality of positions spaced in said third direction.

2. A cutter as set forth in claim 1, wherein said first direction is substantially parallel to the axis of said cutter body, said second direction is substantially circumferential with respect to said axis, and said third direction is substantially radial with respect to said axis.

3. A cutter as set forth in claim 1, wherein said first, second, and third directions are substantially perpendicular to each other.

4. A cutter as set forth in claim 1, wherein said cutter tooth is substantially rectangular in section perpendicular to said second direction.

5. A cutter as set forth in claim 1, wherein said cutter tooth has two substantially flat parallel faces perpendicular to said second direction, one of said faces conformingly engaging said abutment face.

6. A milling cutter comprising, in combination:
 (a) a cutter body member having an axis and formed with a plurality of recesses circumferentially spaced about said axis, said cutter body member having a wall in each recess;
 (b) a plurality of cutter teeth mounted on said body member, each cutter tooth being partly received in a coordinated one of said recesses in contact with said wall, and partly projecting from said body member in a first direction;
 (c) clamping means on said body member, said clamping means engaging said tooth for exerting clamping pressure on the same in a second direction transverse of said first direction toward said wall, and for thereby securing said tooth against movement relative to said body member;
 (d) an abutment member slidable in said one recess in a third direction transverse of said first and second directions, said abutment member having an abutment face obliquely inclined relative to said first and third directions, said abutment face abuttingly engaging a portion of said tooth; and
 (e) securing means for selectively securing said abutment member against sliding movement in said recess in a plurality of positions spaced in said third direction.

7. A cutter as set forth in claim 1, wherein said securing means include a fastening element threaded about an axis extending in said third direction, said fastening element threadedly engaging one of said members and abuttingly engaging the other member for moving said abutment member relative to said body member axially of said fastening element when said fastening element is turned about the axis thereof.

8. A cutter as set forth in claim 7, wherein said recess is outwardly open and said abutment face slopes toward the axis of said fastening element in a direction inward of said recess.

9. A cutter as set forth in claim 1, wherein said abutment face conforms to said portion of said coordinated tooth.

10. A cutter as set forth in claim 1, wherein a major portion of said recess is of circularly arcuate cross section, a major portion of said abutment member being of circularly arcuate cross section and conformingly engaging said major portion of said recess.

11. A cutter as set forth in claim 1, wherein said body member has a bottom face in said recess third of said third direction, said cutter further comprising stop means on said abutment member and engageable with said bottom face for limiting sliding movement of said abutment member in said recess.

12. A cutter as set forth in claim 11, wherein said stop means includes a threaded member mounted on said abutment member for threaded movement toward and away from said bottom face.

13. A cutter as set forth in claim 12, wherein said securing means include a fastening element threaded about an axis extending in said third direction, said fastening element threadedly engaging one of said members and abuttingly engaging the other member for moving said abutment member relative to said body member axially of said fastening element when said fastening element is turned about the axis thereof, said abutment face conforming to said portion of said coordinated tooth, said recess being outwardly open, said abutment face sloping toward the axis of said fastening element in a direction inward of said recess, and said recess and said abutment member having conformingly engaged respective major portions of circularly arcuate cross section.

References Cited by the Examiner

UNITED STATES PATENTS

| | | | |
|---|---|---|---|
| 2,264,299 | 12/41 | Crosby | 29—105 |
| 2,930,111 | 3/60 | St. Clair. | |
| 3,023,486 | 3/62 | Bojner. | |
| 3,027,624 | 4/62 | Payne | 29—105 |
| 3,058,198 | 10/62 | Williams | 29—105 XR |
| 3,079,671 | 3/63 | Payne | 29—105 XR |

FOREIGN PATENTS 872,693    7/61    Great Britain.

WILLIAM W. DYER, Jr., *Primary Examiner.*